(12) United States Patent
Puzio et al.

(10) Patent No.: US 10,888,936 B2
(45) Date of Patent: Jan. 12, 2021

(54) WIRE CUTTING TOOL

(71) Applicant: BLACK & DECKER INC., New Britain, CT (US)

(72) Inventors: Daniel Puzio, Baltimore, MD (US); Scott M. Rudolph, Aberdeen, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 16/401,424

(22) Filed: May 2, 2019

(65) Prior Publication Data

US 2019/0337063 A1 Nov. 7, 2019

Related U.S. Application Data

(60) Provisional application No. 62/667,002, filed on May 4, 2018, provisional application No. 62/680,154, filed on Jun. 4, 2018.

(51) Int. Cl.
*B23D 29/00* (2006.01)
*B23D 15/04* (2006.01)
*B25F 5/02* (2006.01)

(52) U.S. Cl.
CPC ............ *B23D 29/002* (2013.01); *B23D 15/04* (2013.01); *B25F 5/02* (2013.01)

(58) Field of Classification Search
CPC ...... B23D 29/002; B23D 29/00; B23D 15/04; B23D 15/00; B23D 15/12; B25F 5/02
USPC .......... 30/180, 173, 182–184, 194, 241, 242
See application file for complete search history.

(56) References Cited

U.S. PATENT DOCUMENTS

| | | | | | |
|---|---|---|---|---|---|
| 2,211,741 | A | * | 8/1940 | Elwell | B25D 17/04 74/56 |
| 2,224,708 | A | * | 12/1940 | Sittert | F16H 21/44 74/110 |
| 2,232,367 | A | * | 2/1941 | Cherry | B44C 7/027 30/169 |
| 2,376,590 | A | * | 5/1945 | Forss | B23D 27/06 30/241 |
| 5,744,085 | A | * | 4/1998 | Sorberg | B21D 39/20 264/296 |
| 8,517,715 | B2 | * | 8/2013 | Thorson | B29D 23/001 425/392 |
| 8,875,404 | B2 | * | 11/2014 | Scott | B23D 21/00 30/93 |
| 9,494,200 | B2 | * | 11/2016 | Kelleher | B25F 5/001 |
| 10,646,987 | B2 | * | 5/2020 | Barezzani | B23D 29/002 |

* cited by examiner

*Primary Examiner* — Phong H Nguyen
(74) *Attorney, Agent, or Firm* — Adan Ayala

(57) ABSTRACT

A cutting tool includes a housing, a head assembly disposed on the housing and carrying a first blade. A cam drive mechanism is disposed within the housing. The cam drive mechanism carries a second blade opposed to the first blade. A motor drives the cam drive mechanism. A battery pack is electrically connected to the motor. The cam drive mechanism moves the second blade towards the first blade, so that a wire disposed between the first and second blades receives a cutting force of less than 12 kiloNewton. The cam drive mechanism may include a spindle driven by the motor, a radial cam fixed to the spindle, a roller assembly contacting the radial cam, and a shuttle connected to the roller assembly, the shuttle being movable in a reciprocating motion and carrying the second blade.

15 Claims, 5 Drawing Sheets

WIRE CUTTING TOOL

CROSS-REFERENCE TO RELATED APPLICATION

The present application derives priority from U.S. Application No. 62/680,154, filed on Jun. 4, 2018, entitled WIRE CUTTING TOOL, and U.S. Application No. 62/667,002, filed on May 4, 2018, entitled WIRE CUTTING TOOL, which are hereby incorporated in full by reference.

FIELD

The present invention relates to wire cutting tools and methods, and more particularly electric wire cutting power tools.

BACKGROUND

Cable tray systems are used in modern construction to support insulated electrical cables used for power distribution, control and communication. Some cable trays may be made of wire mesh, possibly welded steel wire, and is commonly called a basket cable tray. It is desirable to create a power tools that can facilitate wire cutting, especially the wires used on cable trays.

DESCRIPTION OF THE DRAWINGS

Preferred embodiments of the invention will now be described, by way of example, with reference to the accompanying drawings, of which:

FIG. 2A is a perspective view and FIG. 2B is a partial top plan cross-sectional view along line B-B of FIG. 2A;

FIGS. 6A-6D are exploded, perspective, left and right views, respectively.

DETAILED DESCRIPTION

Figure 2A:
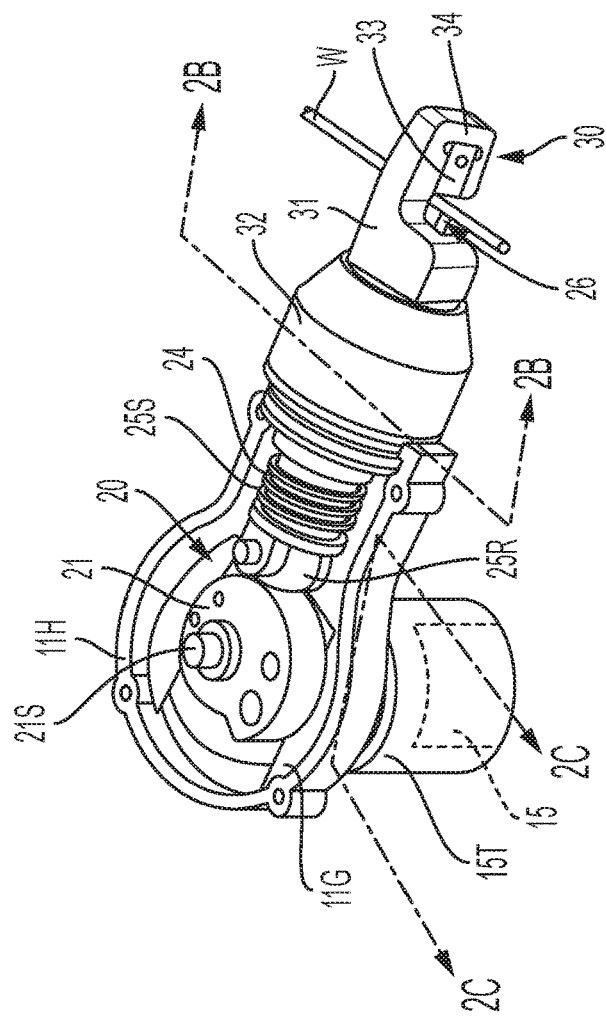
FIGS. 2A-2B are different views of the cam drive mechanism, where
Figure 1:
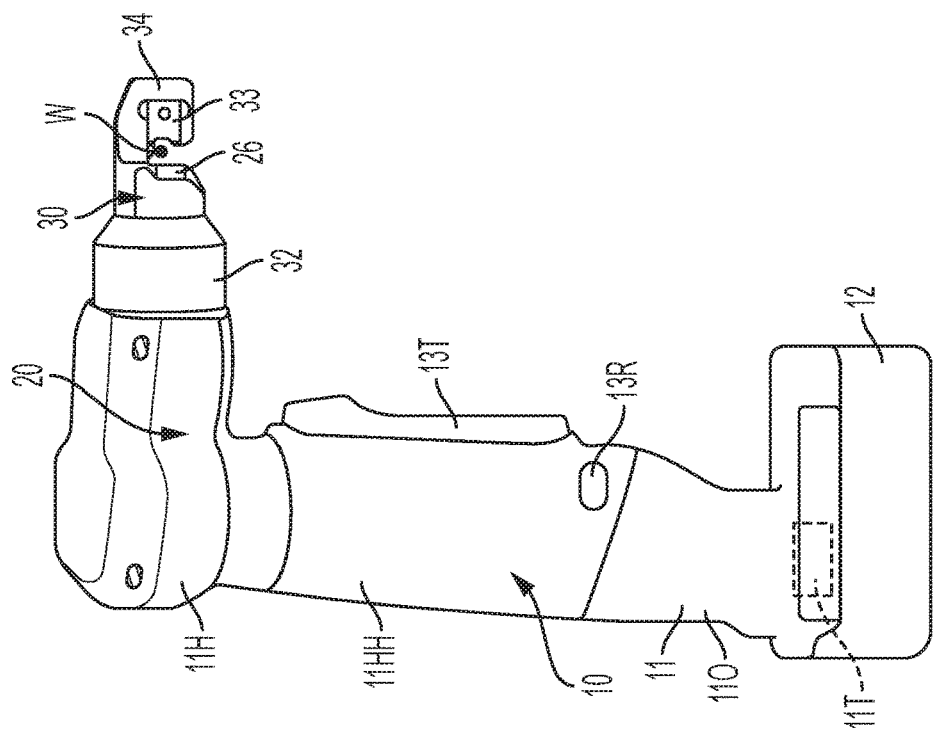
FIG. 1 is a side view of the tool according to the invention.
Figure 2B:
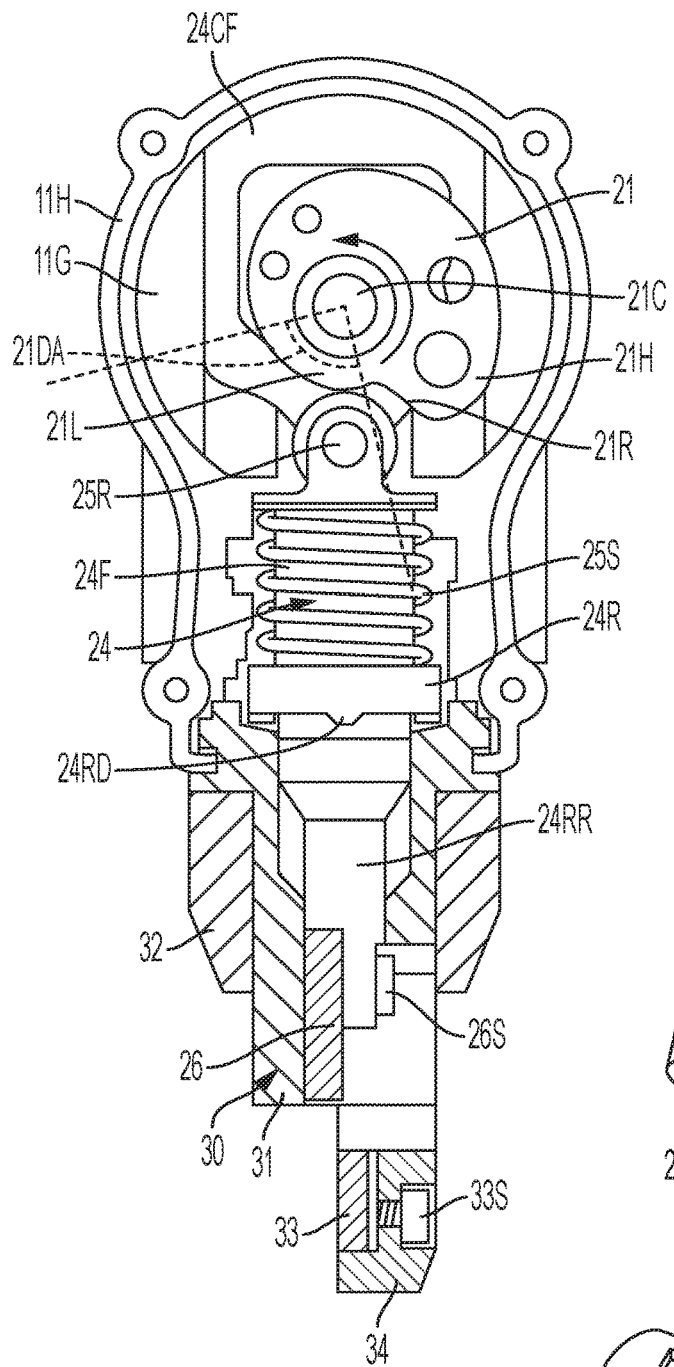
Figure 3:
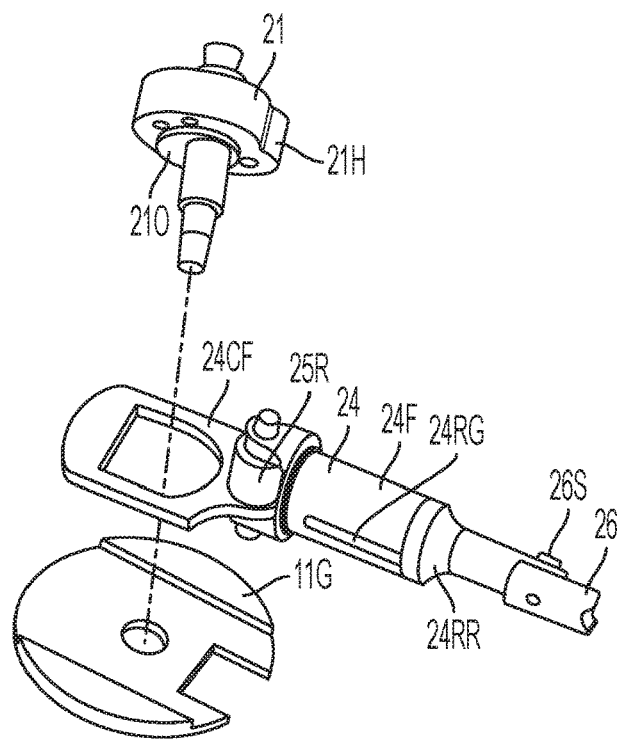
FIG. 3 is a partial exploded view of components of the cam drive mechanism.
Figure 4:
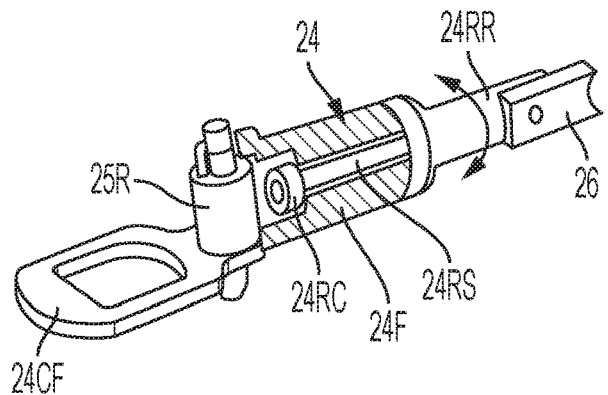
FIG. 4 is a side perspective view of components of the cam drive mechanism of FIGS. 2A-3.
Figure 5:
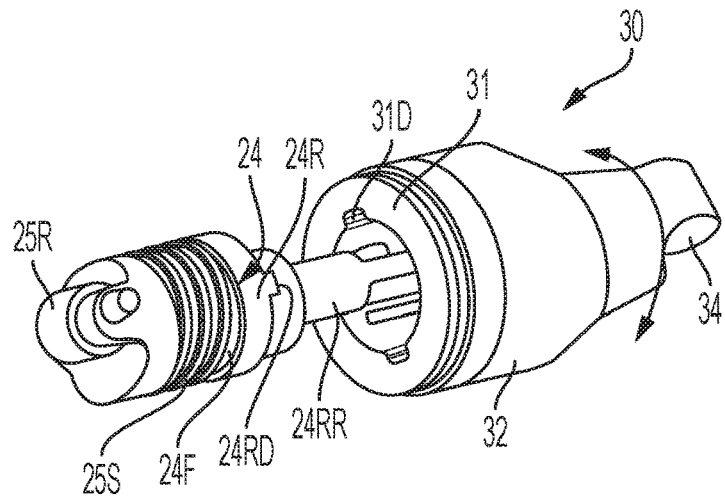
FIG. 5 is a top perspective view of components of the cam drive mechanism of FIGS. 2A-3.

Referring now to the drawings, a cutting tool 10 includes a housing 11 preferably including a handle 11HH, a cutting jaw assembly 30 disposed on housing 11, a cam drive mechanism 20 disposed within housing 11, and a motor 15 for driving cam drive mechanism 20. A power tool battery pack 12 may be attached to housing 11 and electrically connected to tool 10 in order to power motor 15.

Housing 11 may be made of a high-impact plastic, such as polybutylene terephthalate (PBT). Housing 11 may be overmolded with a rubber-like material 11O for better grip.

Housing 11 may also include a housing portion 11H for at least partially encasing cam drive mechanism 20. Housing portion 11H is preferably made of metal, such as aluminum or magnesium.

For details on power tool battery pack 12, persons skilled in the art are referred to U.S. Pat. Nos. 6,996,909 and 7,661,486, which are fully incorporated herein by reference. Power tool battery pack 12 is preferably electrically connected to tool terminals 11T, and in turn to a switch which is activatable by a trigger 13T, which is movable relative to housing 11.

Upon activation of the switch, power from power tool battery pack 12 is transferred to motor 15. Motor 15 preferably drives a four-stage planetary gear transmission 15T, which has an output spindle 21S.

Referring to FIGS. 2A-5, cam drive mechanism 20 may include a radial cam 21. Preferably radial cam 21 is keyed and/or fixedly attached to the output spindle 21S that radial cam 21 is driven by the motor 15.

Cam drive mechanism 20 may also include a shuttle 24, which preferably moves in a reciprocating motion. Shuttle 24 may be connected to a roller assembly 25R, which contacts radial cam 21. A spring 25S may abut a ring 24R disposed on shuttle 24 and roller assembly 25R, thus biasing roller assembly 25R (and thus shuttle 24) towards radial cam 21.

A blade 26 is attached to shuttle 24. Preferably a screw 26S extends through blade 26 and threadingly engages shuttle 24 to fix the position of blade 26 relative to shuttle 24.

Shuttle 24 preferably extends through a head assembly 30, which may be rotatably attached to housing portion 11H. Head assembly 30 preferably has a portion 34 carrying a blade 33. Blade 33 is preferably disposed opposite of blade 26.

With such arrangement, motor 15 may cause radial cam 21 to rotate. As the distance between the center 21C of radial cam 21 and roller assembly 25R increases, shuttle 24 (and thus blade 26) is moved towards portion 34. As blade 26 moves toward blade 33, a wire W disposed therebetween is cut in a shearing operation. Preferably the cutting force applied to a wire W by blades 26, 33 is at most between about 10 kiloNewton and about 12 kiloNewton.

Persons skilled in the art will recognize that less cutting force would be needed for cutting smaller diameter wires W. For example, wires having a diameter of 4-6 millimeters required a cutting force between 5 kiloNewton and 9 kiloNewton.

As radial cam 21 continues to rotate, radial cam 21 will move from a lobe 21H with a larger distance between the center 21C and the outer perimeter of radial cam 21 to a dwell portion 21L with a smaller distance. Preferably radial cam 21 will have a return portion 21R to help the transition between the lobe 21H and dwell portion 21L. Because spring 25S forces roller assembly 25R (and thus shuttle 24) to remain in contact with radial cam 21, the blade 24 will be moved away from blade 33. Persons of ordinary skill shall recognize that the entire cutting operation is preferably performed with only one revolution of radial cam 21.

Persons skilled in the art will note that the shuttle 24 preferably reciprocates along its longitudinal axis, which is substantially perpendicular to the rotational axis of radial cam 21 and/or the longitudinal axis of motor 15.

Persons skilled in the art should recognize that it is preferable to provide a dwell portion 21L with minimal change to the distance between center 21C and the outer perimeter of radial cam 21 as radial cam 21 is rotated. The size of the dwell portion 21L is (i.e., the rotational angle 21DA between the beginning and end of the dwell portion 21L) can be selected to ensure that, when the user releases the trigger after the completion of a cutting operation, the radial cam 21 will coast down and stop at a location where the blade 26 has not moved towards blade 33. This is advantageous as it would ensure that the space between blades 24, 33 is maximized, allowing the user to easily insert another wire W for cutting. Persons skilled in the art will recognize that, by properly selecting the dwell angle 21DA, there is no need to provide sensors and electronic controls to ensure that the radial cam 21 is disposed at a starting position. It is preferable to provide a dwell angle 21DA between 45 degrees and 135 degrees, and preferably about 90 degrees.

It may also be advantageous to provide cutting tool 10 with a button 13R to reverse the rotational direction of motor 15 and thus of radial cam 21. Button 13R may be connected to a momentarily-closed switch (not shown) to indicate a desired direction change to a motor control. Alternatively, button 13R may be connected to a sliding direction switch, as commonly found on drills. Preferably button 13R is spring-biased towards the "forward" direction position to ensure that the button 13R is not accidentally activated while a cut is occurring. In this manner, blade 26 can be retracted in the event of a jam or if radial cam 21 (and blade 26) has moved beyond the starting position.

Radial cam 21 may also have a return cam portion 21O integrally formed on the underside of radial cam 21. Return cam portion 21O would contact a cam follower plate 24CF attached to shuttle 24 and sliding along a guide plate 11G disposed on housing portion 11H. Return cam portion 21O is shaped so that, as radial cam 21 rotates towards the starting position, return cam portion 21O is pushing cam follower plate 24CF (and thus moving shuttle 24) rearwardly and away from blade 33.

Shuttle 24 is preferably made of two main portions: a rear portion 24F and a front portion 24RR. Front portion 24RR is preferably rotatable relative to rear portion 24F. Front portion 24RR may have a shaft 24RS extending through rear portion 24F, allowing rotation of front portion 24RR relative to rear portion 24F. A cap 24RC may be disposed at the end of shaft 24RS to ensure that front and rear portions 24RR, 24F are not separated.

Persons skilled in the art will recognize that having front portion 24RR being rotatable relative to rear portion 24F will enable the user to change the cutting angle of blade 26. In order for cutting tool 10 to be effective, the user must also change the cutting angle of blade 33.

As mentioned above, head assembly 30 is preferably rotatably attached to housing portion 11H. Head assembly 30 preferably has a body 31 that is connected to portion 34 (and thus supports blade 33). Body 31 may have detent notches 31D that engage the detents 24RD of ring 24R. Ring 24R is preferably slidable along rear portion 24F while being axially fixed relative to rear portion 24F by engaging a slot or notch 24RF on rear portion 24F. Spring 25S biases ring 24R (and thus detents 24RD) into engagement with the detent notches 31D.

Persons skilled in the art will recognize that spring 25S preferably biases both ring 24R into contact with body 31, as well as biasing roller assembly 25R into contact with radial cam 21. However persons skilled in the art shall also recognize that such function may be accomplished with multiple separate springs.

With such arrangement, the detents 24RD will fix the rotational position of head assembly 30. When the user desires to rotate head assembly 30, the user can twist head assembly 30, causing detent notches 31D to ride along the inclined surfaces of detents 24RD. This causes ring 24R to slide rearwardly along slot or notch 24RF. Because blade 26 contacts a wall of body 31, blade 26 (and thus front portion 24RR) rotate together with body 31. Spring 25S will continue to bias ring 24R against body 31 until the detents 24RD engage the next detent notch 31D.

Preferably the detent notches 31D are disposed so that the head assembly 30, front portion 24RR and blades 26, 33 can be held in place at commonly desired rotational positions, such as 0 degrees, 90 degrees, 180 degrees and 275 degrees.

Head assembly 30 may include a sleeve 32 disposed on body 31. Preferably body 31 and sleeve 32 are made of different materials, such as metal (such as steel) and plastic, respectively. Persons skilled in the art will recognize that using multiple materials for head assembly 30 will result in a lighter assembly than if head assembly 30 was made solely of steel.

Body 31 preferably has at least one wall 31W. Sleeve 32 may have a channel 32C receiving body 31. Channel 32C may have a wall profile 32P substantially matching the at least one wall 31W so that body 31 will rotate with sleeve 32 when the user rotates sleeve 32.

Figure 6A:
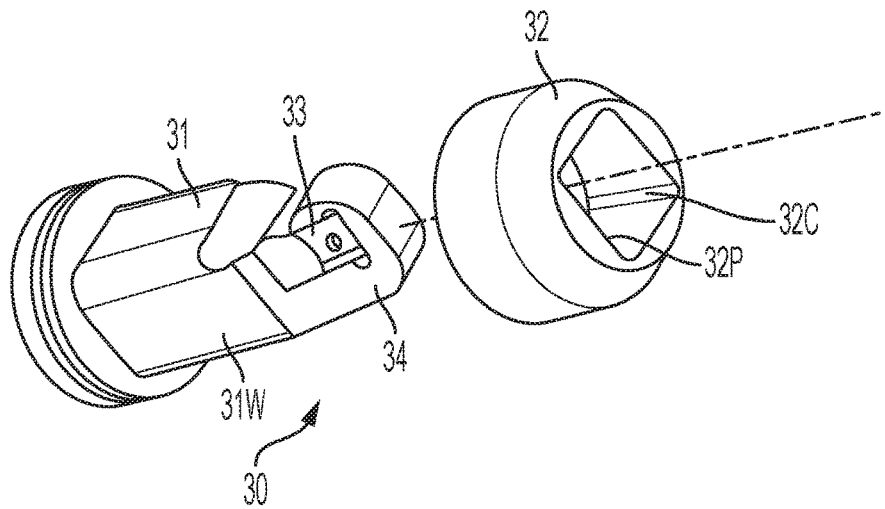
FIGS. 6A-6D are different views of the head assembly, where
Figure 6B:
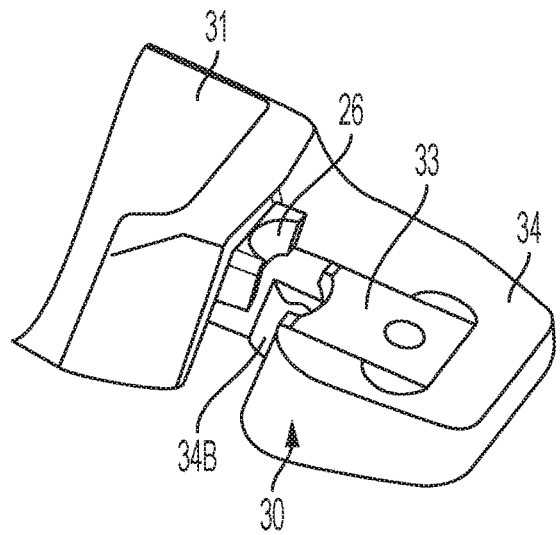
Figure 6C:
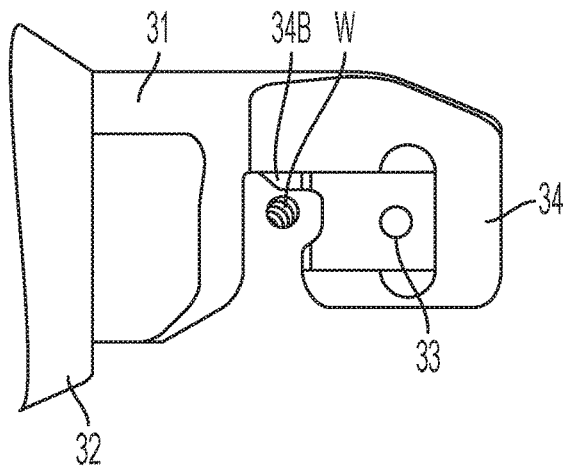
Figure 6D:
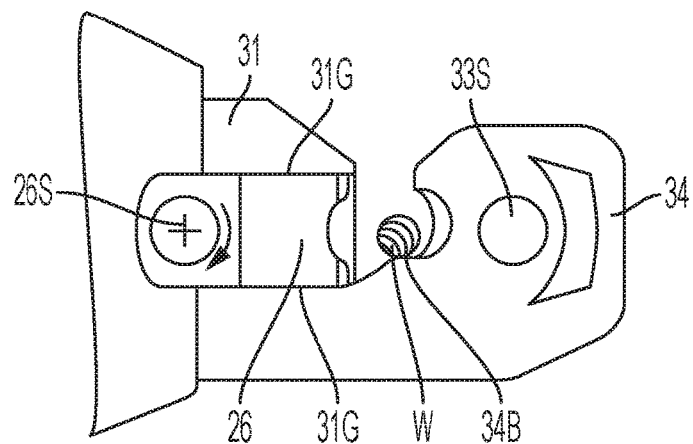

Referring to FIGS. 6B-6D, portion 34 preferably has a protrusion 34B that can be used to locate wire W at the optimal position between blades 26, 33. The user can just contact wire W with protrusion 34B. At this location, the wire W is placed between blades 26, 33.

Body 31 may also have at least one guide wall 31G. Such guide wall(s) 31G may ensure that blade 26 remains aligned while the user is tightening screw 26S. Persons skilled in the art will recognize that it is desirable to place at least one guide wall 31G on the side adjacent to blade 26 to which blade 26 would rotate along with screw 26S as it is tightened by rotating in a clockwise direction. Without such guide wall 31G, the blade 26 would rotate in a clockwise direction and no longer be aligned with blade 33 and/or not being retractable into head assembly 30 when shuttle 24 is supposed to return to the retracted position as blade 26 would contact head assembly 30.

Persons skilled in the art shall recognize that cam drive mechanism 20 may create such large forces that it could break head assembly 30. Accordingly it is preferable to provide a clutch mechanism to limit the forces imparted on head assembly 30.

Figure 7:
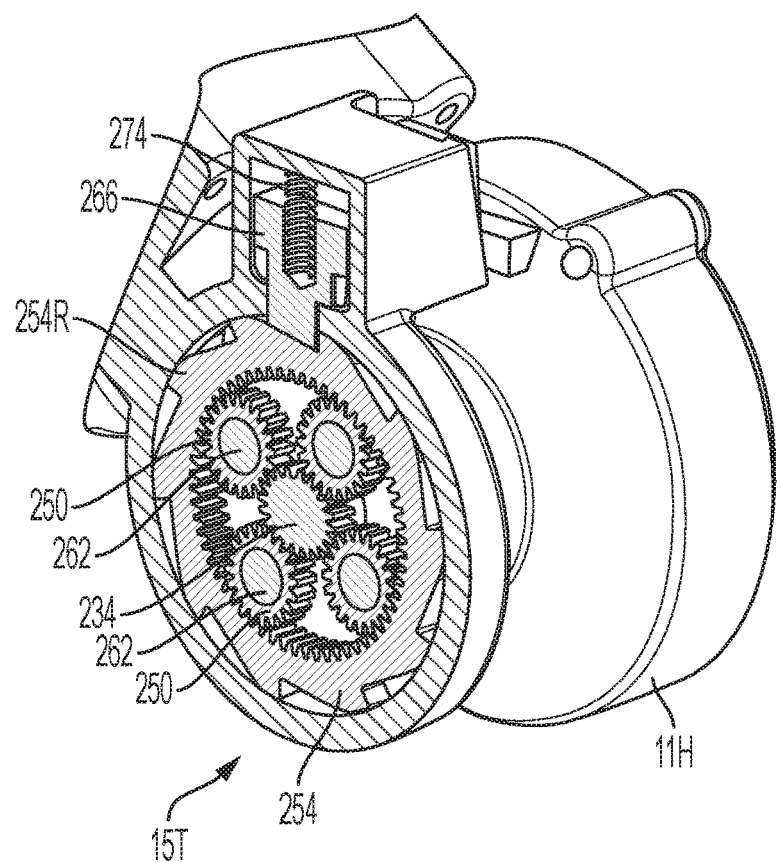
FIG. 7 is a perspective cross-sectional view along line C-C of FIG. 2A.

Referring to FIG. 7, four-stage planetary gear transmission 15T may be connected to output spindle 21S and preferably includes four planetary gears 250, a ring gear 254, and a spline 234. Spline 234 may engage the planetary gears 250 such that, as spline 234 is rotated by motor 15, the planetary gears 250 move about the spline 234 within the ring gear 254. The output spindle 21S is preferably coupled to the planetary gears 250 via short rods 262 such that the output spindle 21S rotates (causing cam 21 to rotate at a reduced speed) as the planetary gears 250 move within the ring gear 254.

Housing 11H may carry a clutch 266 and a spring 274 biasing clutch 266 to engage the ring gear 254 to prevent rotation of the ring gear 254 relative to the housing 11H. In this position, the transmission 15T transmits rotation of the motor 15 (and spline 234) to the cam 21.

When blade 26 is jammed or cannot move further (causing cam 21 to stop), motor 15 is still providing rotational force. This causes ring gear 254 to start rotating, causing clutch 266 to ride up along the ramps 254R on ring gear 254, allowing the ring gear 254 to rotate relative to the housing 11H such that rotation of the output spindle 21S is not transmitted to the cam 21 and thus to blade 26. Persons skilled in the art are referred to U.S. Pat. Nos. 8,875,404 and 9,494,200, which are fully incorporated herein by reference, for further information on mechanical clutch arrangements that can be used in cutting tool 10.

Figure 8:
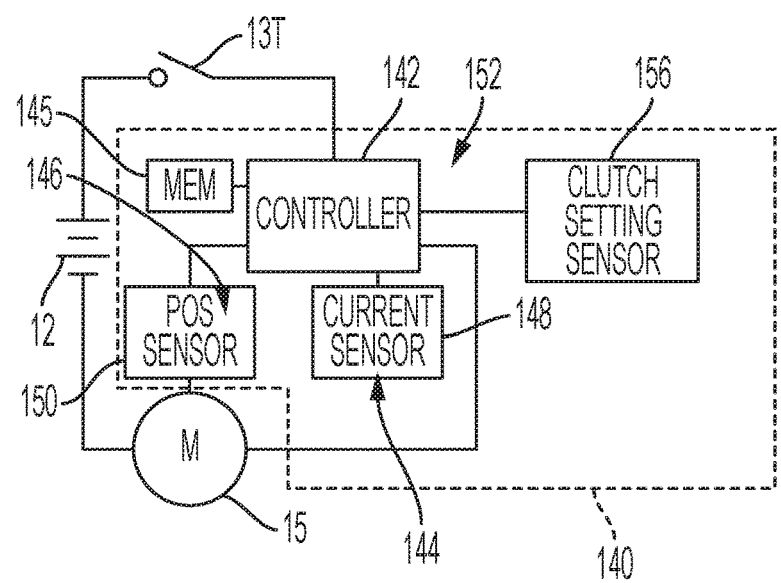
FIG. 8 is a schematic diagram of an electronic clutch of the tool.

Cutting tool 10 may also (or may instead) be provided with an electronic clutch circuit for accomplishing the same purpose. Referring to FIG. 8, electronic clutch 140 preferably includes a controller 142, a current sensing circuit 144, and a position sensing or rotation sensing circuit 146. The current sensing circuit 144 may include a current sensor 148 (e.g., a shunt resistor) that senses the amount of current being delivered to the motor 15 and provides a current sensing signal corresponding to the sensed current to the controller 142. The rotation sensing circuit 146 may include one or more rotation sensors 150 that sense changes in the angular position of the motor 15's output shaft and provides a signal corresponding to the angular rotation, speed, and/or acceleration of the motor 15 to the controller 142.

In one embodiment, the controller 142 is further defined as a microcontroller. In other embodiments, controller 142 refer to, be part of, or include an electronic circuit, an Application Specific Integrated Circuit (ASIC), a processor (shared, dedicated, or group) and/or memory (shared, dedicated, or group) that execute one or more software or firmware programs, a combinational logic circuit, and/or other suitable components that provide the described functionality.

In one embodiment, the position sensors 146 can be the Hall sensors that are already part of a brushless motor. For example, the cutting tool 10 may include a three-phase brushless motor 15, where the rotor includes a four pole magnet, and there are three Hall sensors positioned at 120° intervals around the circumference of the rotor. As the rotor rotates, each Hall sensor senses when one of the poles of the four pole magnet passes over the Hall sensor. Thus, the Hall sensors can sense each time the rotor, and thus the output shaft, rotates by an increment of 60°. By sensing motor characteristics like speed and deceleration the controller might infer that the blade has jammed or cannot more further and act to shut down and/or brake the motor.

In one embodiment, the rotation sensing circuit 146 can use the signals from the Hall sensors to infer or calculate the amount of angular rotation, speed, and/or acceleration of the rotor. For example, the rotation sensing circuit 146 includes a clock or counter that counts the amount of time or the number of counts between each 60° rotation of the rotor. The controller 142 can use this information to calculate or infer the amount of angular rotation, speed, and/or acceleration of the motor 15.

The electronic clutch 140 may also include a clutch setting circuit 152. Persons skilled in the art will recognize that, if it is desirable for the clutch to be adjustable by the user, the clutch setting circuit 152 may include a clutch setting sensor that senses the setting set of a clutch setting input device (not shown) and that provides a signal corresponding to that clutch setting to the controller 142.

The electronic clutch 140 may include a memory 145 coupled to the controller 142.

Persons skilled in the art are referred to U.S. Pat. No. 9,193,055, which is fully incorporated herein by reference, for further information on the electronic clutch that can be used in cutting tool 10.

It will be understood that the above description and the drawings are examples of particular implementations of the invention, but that other implementations of the invention are included in the scope of the claims.

What is claimed is:

1. A cutting tool comprising:
   a housing;
   a head assembly disposed on the housing, the head assembly carrying a first blade;
   a cam drive mechanism disposed within the housing, the cam drive mechanism carrying a second blade opposed to the first blade;
   a motor for driving the cam drive mechanism; and
   a battery pack electrically connected to the motor, the battery pack being removably attached to the housing,
   wherein the cam drive mechanism moves the second blade towards the first blade, so that a wire disposed between the first and second blades receives a cutting force of less than 12 kiloNewton, wherein the cam drive mechanism comprises a spindle driven by the motor, a radial cam fixed to the spindle, a roller assembly contacting the radial cam, and a shuttle connected to the roller assembly, the shuttle being movable in a reciprocating motion and carrying the second blade, the radial cam having a return cam portion integrally formed thereon, which contacts a cam follower plate attached to the shuttle.

2. The cutting tool of claim 1, further comprising a screw extending through the second blade and threadingly engaging the shuttle, and
   the head assembly having at least one wall contacting the second blade so that the second blade cannot rotate when the screw is tightened.

3. The cutting tool of claim 1, wherein the radial cam has a dwell angle between 45 degrees and 135 degrees.

4. The cutting tool of claim 1, wherein the shuttle has a front portion and a rear portion rotatably connected to the front portion, so that the front portion is rotatable relative to the rear portion.

5. The cutting tool of claim 1, further comprising a transmission disposed between the spindle and the motor, and a clutch engaging the transmission, allowing the motor to rotate relative to the spindle when a predetermined rotational force threshold has been exceeded.

6. The cutting tool of claim 1, wherein the cutting force is between 5 kiloNewton and 9 kiloNewton.

7. The cutting tool of claim 1, wherein the head assembly is rotatably connected to the housing.

8. The cutting tool of claim 7, where at least one detent holds the head assembly in a rotational position relative to the housing.

9. The cutting tool of claim 7, wherein the head assembly has a body made of a first material and a sleeve disposed on the body made of a second material.

10. A cutting tool comprising:
    a housing;
    a head assembly disposed on the housing, the head assembly carrying a first blade;
    a cam drive mechanism disposed within the housing, the cam drive mechanism carrying a second blade opposed to the first blade;
    a motor for driving the cam drive mechanism; and
    a battery pack electrically connected to the motor, the battery pack being removably attached to the housing,
    wherein the cam drive mechanism moves the second blade towards the first blade, so that a wire disposed between the first and second blades receives a cutting force of less than 12 kiloNewton, wherein the cam drive mechanism comprises a spindle driven by the motor, a radial cam fixed to the spindle, a roller assembly contacting the radial cam, and a shuttle connected to the roller assembly, the shuttle being movable in a reciprocating motion and carrying the second blade, wherein the shuttle has a front portion and a rear portion rotatably connected to the front portion, so that the front portion is rotatable relative to the rear portion.

11. The cutting tool of claim 10, further comprising a screw extending through the second blade and threadingly engaging the shuttle, and the head assembly having at least one wall contacting the second blade so that the second blade cannot rotate when the screw is tightened.

12. The cutting tool of claim 10, wherein the radial cam has a dwell angle between 45 degrees and 135 degrees.

13. The cutting tool of claim 10, wherein the radial cam has a return cam portion integrally formed thereon, which contacts a cam follower plate attached to the shuttle.

14. The cutting tool of claim 10, comprising a transmission disposed between the spindle and the motor, and a clutch engaging the transmission, allowing the motor to rotate relative to the spindle when a predetermined rotational force threshold has been exceeded.

15. The cutting tool of claim 10, the cutting force is between 5 kiloNewton and 9 kiloNewton.

\* \* \* \* \*